United States Patent
Maheswaran et al.

(10) Patent No.: US 11,586,830 B2
(45) Date of Patent: Feb. 21, 2023

(54) SYSTEM AND METHOD FOR REINFORCEMENT LEARNING BASED CONTROLLED NATURAL LANGUAGE GENERATION

(71) Applicant: Coinbase, Inc., Oakland, CA (US)

(72) Inventors: Arjun Maheswaran, Bangalore (IN); Akhilesh Sudhakar, Chennai (IN); Bhargav Upadhyay, Mangrol (IN)

(73) Assignee: PM Labs, Inc., Walnut, CA (US)

( * ) Notice: Subject to any disclaimer, the term of this patent is extended or adjusted under 35 U.S.C. 154(b) by 357 days.

(21) Appl. No.: 16/891,311

(22) Filed: Jun. 3, 2020

(65) Prior Publication Data

US 2021/0383074 A1    Dec. 9, 2021

(51) Int. Cl.
  *G06F 40/40*    (2020.01)

(52) U.S. Cl.
  CPC ............................. *G06F 40/40* (2020.01)

(58) Field of Classification Search
  CPC ............ G06F 40/40; G06N 3/04; G06N 3/08
  USPC .............................................................. 704/9
  See application file for complete search history.

(56) References Cited

U.S. PATENT DOCUMENTS

| | | | |
|---|---|---|---|
| 2018/0300317 A1 | 10/2018 | Bradbury | |
| 2019/0179938 A1 | 6/2019 | Feuz et al. | |
| 2019/0311002 A1* | 10/2019 | Paulus | G06N 3/006 |
| 2020/0104371 A1* | 4/2020 | Ma | G06F 40/58 |
| 2021/0086353 A1* | 3/2021 | Shah | G05B 13/027 |

FOREIGN PATENT DOCUMENTS

| | | |
|---|---|---|
| CN | 109710915 | 5/2019 |
| EP | 3407264 A1 | 11/2018 |
| EP | 3408755 A1 | 12/2018 |

OTHER PUBLICATIONS

M. Moh, A. Gajjala, S. C. R. Gangireddy and T.-S. Moh, "On Multi-tier Sentiment Analysis Using Supervised Machine Learning," 2015 IEEE/WIC/ACM International Conference on Web Intelligence and Intelligent Agent Technology (WI-IAT), 2015, pp. 341-344, doi: 10.1109/WI-IAT.2015.154. (Year: 2015).*

(Continued)

*Primary Examiner* — Bharatkumar S Shah
(74) *Attorney, Agent, or Firm* — Jason C. Cameron

(57) ABSTRACT

A system for reinforcement learning based controlled natural language generation is disclosed. The system includes a token generator subsystem to generate an initial output phrase including a sequence of output tokens. The system includes trained models associated with corresponding predefined tasks. Each trained model includes an attention layer to compute attention-based weights for each output token. The trained models include a scoring layer to generate a phrase sequence level score for the output phrase. The trained models include a reward generation layer to generate dense rewards for each output token based on the attention-based weights and the phrase sequence level score. The trained models include a feedback score generation layer to generate a feedback score based on the dense rewards and reward weights assigned to the dense rewards of the corresponding trained models. The feedback score generation layer provides the feedback score iteratively to the token generator subsystem.

13 Claims, 5 Drawing Sheets

(56) References Cited

OTHER PUBLICATIONS

M. Moh, A. Gajjala, S. C. R. Gangireddy and T.-S. Moh, "On Multi-tier Sentiment Analysis Using Supervised Machine Learning," 2015 IEEE/WIC/ACM International Conference on Web Intelligence and Intelligent Agent Technology (WI-IAT), 2015, pp. 341-344, doi: 10.1109/WI-IAT.2015.154. (Year: 2015) (Year: 2015).*

* cited by examiner

SYSTEM AND METHOD FOR REINFORCEMENT LEARNING BASED CONTROLLED NATURAL LANGUAGE GENERATION

BACKGROUND

Embodiment of the present disclosure relates to reinforcement learning and, more particularly to, a system and a method for reinforcement learning based controlled natural language generation.

Controlled Natural language generation in artificial intelligence is a process to generate natural language conditioned on the input data such as text style transfer, machine translation and summarization. Reinforcement learning based methods have been used to train such systems as carefully designed training can help to improve controlled natural language generation system by making it generalize well on unseen data. Various reinforcement learning-based controlled natural language generation systems are currently available in market with numerous features. One example of the controlled natural language generation is text style transfer which is the task of re-writing text of a given style into a target style without using a parallel corpus of source style and target style sentences for training. The text style transfer is an important natural language generation problem since the text style transfer has wide applications across different domains. The text style transfer has been used to adapt texts to specific artistic writing styles, make texts formal or informal, alter sentiment or the like.

One such system involves a challenge of 'sparse rewards' which contains the rewards which are only available at the output sentence level. However, the generative models need rewards at the output token level. In order to overcome such problem, the aforementioned systems utilize potential-based reward shaping techniques to get token level rewards. The most popular technique among such technique is the 'rollout' strategy. However, the rollout strategy does not allow for precise reward assignment that penalizes a poorly generated token or encourages a well generated token of the output. As a result, such technique performs poorly as judged by human evaluations.

Hence, there is a need for an improved system and method for reinforcement learning-based text style transfer to address the aforementioned issue(s).

BRIEF DESCRIPTION

In accordance with an embodiment of the present disclosure, a system for reinforcement learning-based controlled natural language generation is provided. The system includes a token generator subsystem configured to generate an initial output phrase including a sequence of a plurality of output tokens based on a sequence of a plurality of input tokens corresponding to a natural language text. The system also includes an output validation subsystem includes a plurality of trained models associated with a corresponding plurality of predefined tasks. Each of the plurality of trained model includes an attention layer configured to compute a plurality of attention-based weights for each of the corresponding plurality of output tokens generated by the token generator subsystem. The plurality of trained models also includes a scoring layer configured to generate a phrase sequence level score for the output phrase including the plurality of output tokens generated by the token generator subsystem. The plurality of trained models further includes a reward generation layer configured to generate a plurality of dense rewards for each of the plurality of output tokens based on the plurality of attention-based weights computed by the attention layer and the phrase sequence level score generated by the scoring layer. The plurality of trained models further includes a feedback score generation layer configured to generate a feedback score based on the plurality of dense rewards generated by the reward generation layer and a plurality of reward weights assigned to the plurality of dense rewards of the corresponding plurality of trained models. The feedback score generation layer provides the feedback score iteratively to the token generator subsystem and generates a resultant output phrase based on comparison with the initial output phrase to guide the plurality of trained models.

In accordance with another embodiment of the present disclosure, a method for reinforcement learning-based controlled natural language generation is provided. The method includes generating, by a token generator subsystem, an output phrase comprising a sequence of a plurality of output tokens based on a sequence of a plurality of input tokens corresponding to a natural language text. The method also includes computing, by an attention layer of a plurality of trained model, a plurality of attention-based weights for each of the corresponding plurality of output tokens. The method further includes generating, by a scoring layer of the plurality of trained models, a phrase sequence level score for the output text comprising the plurality of output tokens. The method further includes generating, by a reward generation layer of the plurality of trained models, a plurality of dense rewards for each of the plurality of output tokens based on the plurality of attention-based weights and the phrase sequence level score. The method further includes generating, by a feedback score generation layer of the plurality of trained models, a feedback score based on the plurality of dense rewards and a plurality of weights assigned to the plurality of dense rewards of the corresponding plurality of trained models. The method further includes providing, by the feedback score generation layer of the plurality of trained models, the feedback score iteratively to the token generator subsystem and generates a resultant output phrase based on comparison with the initial output phrase to guide the plurality of trained models.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
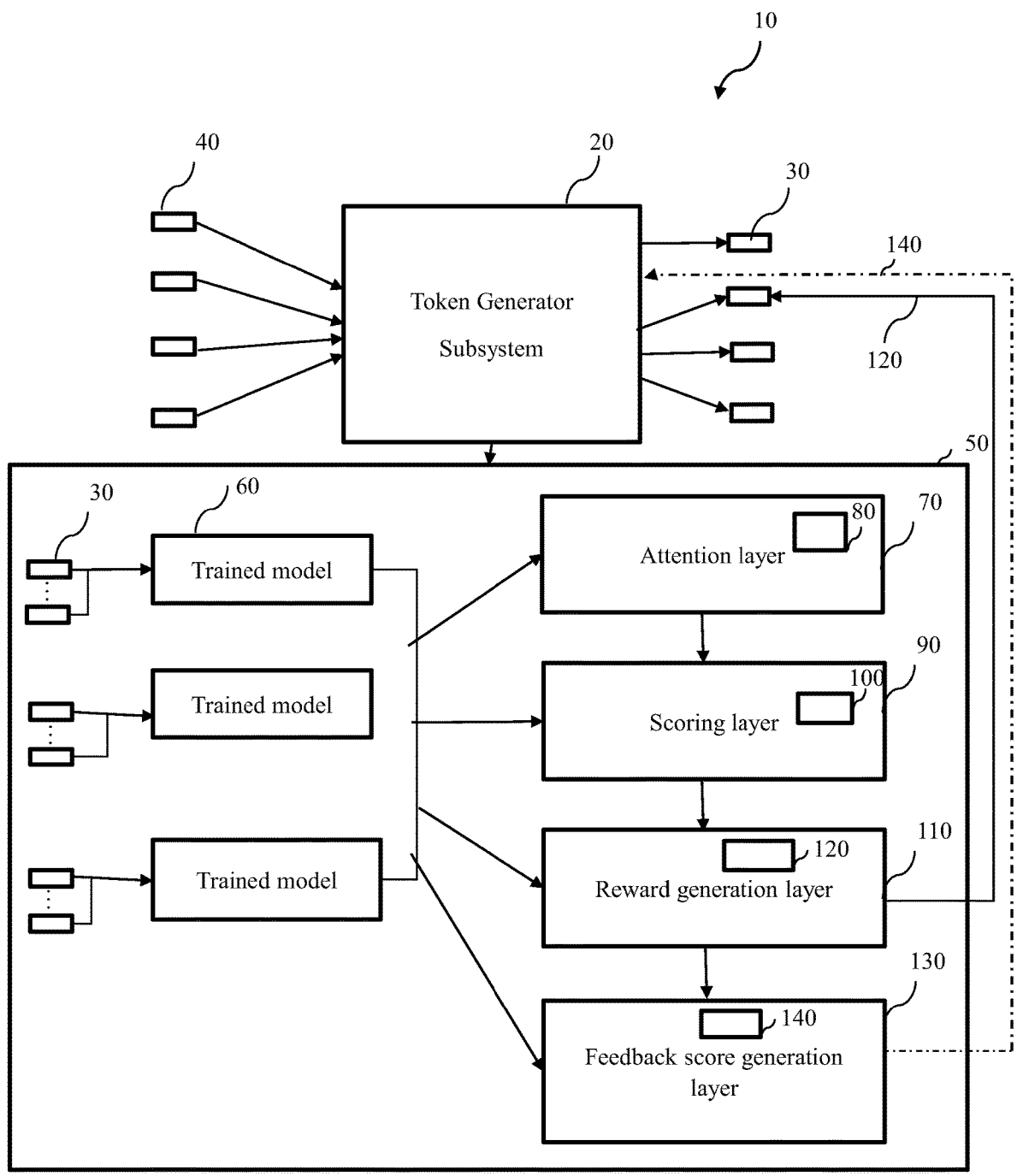
FIG. 1 is a block diagram representation of a system for reinforcement learning based controlled natural language generation in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to system and method for reinforcement learning based controlled natural language generation. The system includes a token generator subsystem to generate an initial output phrase including a sequence of output tokens based on a sequence of input tokens corresponding to a natural language text. The system also includes an output validation subsystem includes trained models associated with corresponding predefined tasks. Each trained model includes an attention layer to compute attention-based weights for each of the corresponding output tokens generated by the token generator subsystem. The trained models also include a scoring layer to generate a phrase sequence level score for the output phrase including the output tokens generated by the token generator subsystem. The trained models further include a reward generation layer to generate dense rewards for each output token based on the attention-based weights computed by the attention layer and the phrase sequence level score generated by the scoring layer. The trained models further include a feedback score generation layer to generate a feedback score based on the dense rewards generated by the reward generation layer and reward weights assigned to the dense rewards of the corresponding trained models. The feedback score generation layer also provides the feedback score iteratively to the token generator subsystem and generates a resultant output phrase based on comparison with the initial output phrase to guide the plurality of trained models.

FIG. 1 is a block diagram representation of a system 10 for reinforcement learning based controlled natural language generation in accordance with an embodiment of the present disclosure. The system 10 includes a token generator subsystem 20 to generate an initial output phrase including a sequence of output tokens 30 based on a sequence of input tokens 40 corresponding to a natural language text. The system 10 also includes an output validation subsystem 50 includes trained models 60 associated with corresponding predefined tasks. Each trained model 60 includes an attention layer 70 to compute attention-based weights for each of the corresponding output tokens 30 generated by the token generator subsystem 20. The trained models 60 also include a scoring layer 90 to generate a phrase sequence level score 100 for the output phrase including the output tokens 30 generated by the token generator subsystem 20. The trained models 60 further include a reward generation layer 110 to generate dense rewards 120 for each output token 30 based on the attention-based weights 80 computed by the attention layer 70 and the phrase sequence level score 100 generated by the scoring layer 90. The trained models 60 further include a feedback score generation layer 130 to generate a feedback score 140 based on the dense rewards 120 generated by the reward generation layer 110 and reward weights 150 assigned to the dense rewards 120 of the corresponding trained models 60. The feedback score generation layer 130 also provides the feedback score 140 iteratively to the token generator subsystem 20 and generates a resultant output phrase based on comparison with the initial output phrase to guide the plurality of trained models. In one embodiment, the reinforcement learning based controlled natural language generation may include text style transfer, machine translation and summarization or the like. One non-limiting embodiment of the system such as text style transfer is described in the following FIG. 2.

Figure 2:
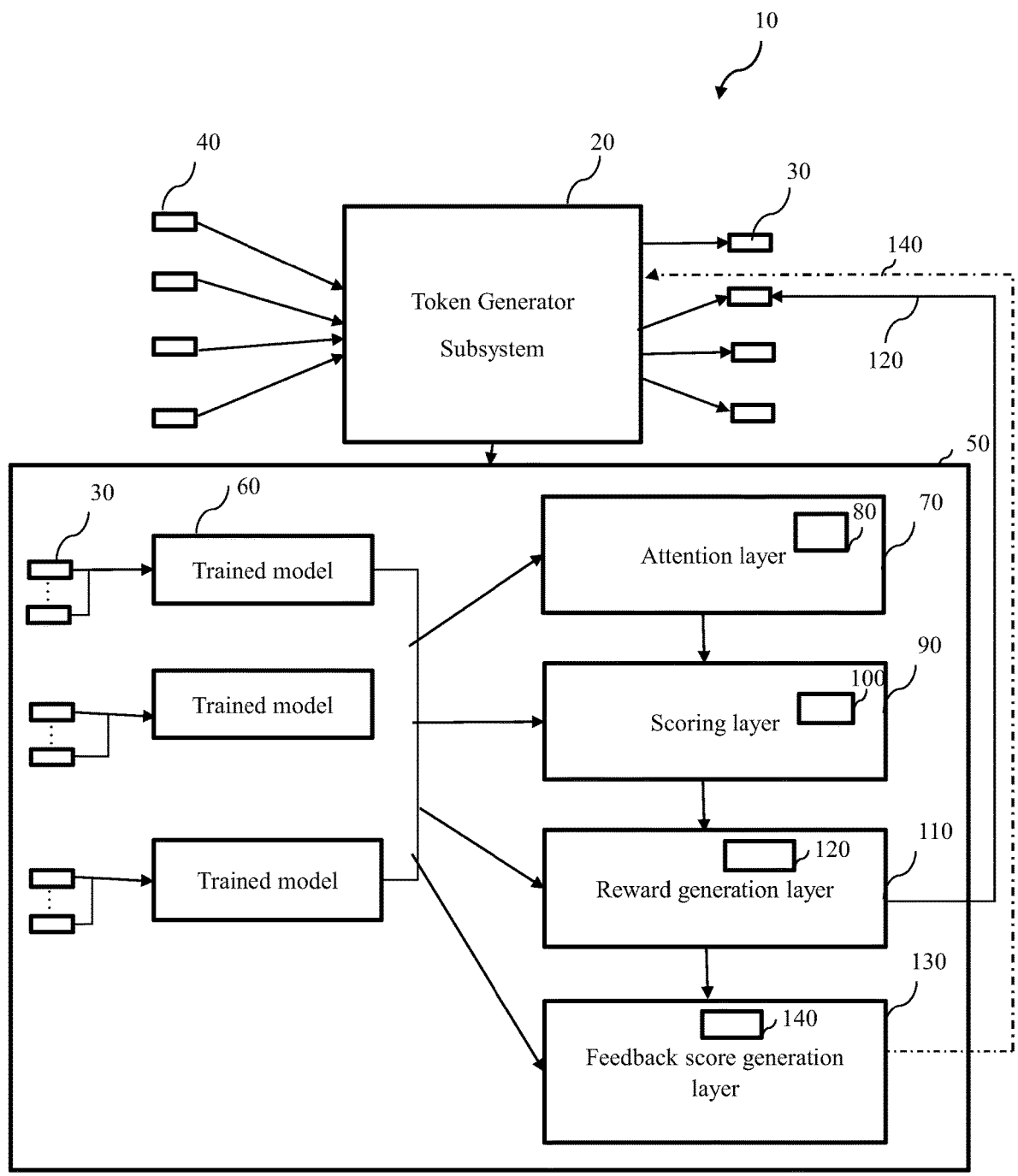
FIG. 2 is a block diagram representation of one embodiment of the system of FIG. 1 in accordance with an embodiment of the present disclosure.

FIG. 2 is a block diagram representation of one embodiment of the system of FIG. 1 in accordance with an embodiment of the present disclosure. The system 10 includes a token generator subsystem 20 to generate an initial output phrase including a sequence of output tokens 30 based on a sequence of input tokens 40 corresponding to a natural language text. As used herein, the natural language text is a text or phrase in a human readable format. In a specific embodiment, the output tokens 30 may be representative of words. In one non limiting embodiment, the natural language text may include a text of first style. In another non limiting embodiment, the initial output phrase may include a text of second style which is different from the first style. Specifically, the second style may be opposite to the first style. Text style transfer is the task of re-writing text of a given style into a target style without using a parallel corpus of source style and target style sentences for training. The reinforcement learning based style transformer utilizes dense rewards, for each of the goals of style transfer such as target style match, content preservation and fluency. The goals of a good style transfer system are to generate sentences that possess the target style, are fluent and natural sounding, and preserve the non-stylistic parts (content) of the source sentence.

In one non limiting embodiment, the initial output phrase may include one or more attributes-based output tokens and one or more content-based output tokens. As used herein, the "attribute-based output token" is representative of stylistic words in a sentence and "content-based output token" is representative of the non-stylistic words. The content-based output token alone is style-neutral, while the attributes-based output token lends the sentence a style. Every word in any sentence is either an attribute word or a content word. The attribute words decide the style of the output and the content words determine the extent of content preservation. In a specific embodiment, the token generator subsystem 20 may generate the output phrase by sampling from a vocabulary at each timestamp. Each output token 30 is sampled over the vocabulary. In such an embodiment, the sampling may include a top-p sampling method, nucleus sampling method or the like. Such sampling method samples the input tokens 40 from a set of top tokens that make up a cumulative probability. For each input natural language text in the reinforcement learning-based training, the token generator subsystem 20 generates multiple initial output tokens 30 by repeating the above process for a predefined time to ensure sufficient exploration.

The system 10 also includes an output validation subsystem 50 which includes multiple trained models 60. Each trained model 60 is associated with corresponding predefined tasks. In one embodiment, the trained models 60 associated with the corresponding predefined tasks may include a sentiment analysis, a content analysis and a fluency analysis which is a specific type of the text style transfer. For example, a first trained model from the multiple trained models 60 is assigned with the task of sentiment analysis such that sentiments of the natural language text are transferred correctly to the initial output phrase. Similarly, the second trained model from the multiple trained models 60 is assigned the task of content analysis of the initial output phrase or the like.

Each trained model 60 includes an attention layer 70 which computes attention-based weights 80 for each corresponding output token 30 generated by the token generator subsystem 20. In detail, the attention layer 70 may assign embeddings to each output token 30. The embeddings are representative of text in an n-dimensional space and is a learned representation for text. The embeddings may be in a machine-readable format. Further, the attention layer 70 assigns various encoding codes to the corresponding output tokens 30 based on the assigned embeddings. The encoding codes are also in a machine-readable format and different than the embeddings.

In one embodiment, the attention layer 70 may compute the attention-based weights 80 by applying higher attention on the encoding codes corresponding to the one or more attributes-based output tokens than the encoding codes corresponding to the one or more content-based output tokens. For content analysis, the attention weights 80 are used to identify attribute words in the initial output phrase which may be considered as attributes and other words in the initial output phrase are identified as content words. In such an embodiment, each attention-based weight 80 may include a sign and a magnitude.

Furthermore, each trained model 60 also includes a scoring layer 90 to generate a phrase sequence level score 100 for the initial output phrase including the output tokens 30 generated by the token generator subsystem 20. More specifically, the scoring layer 90 generates the phrase sequence level score 100 for the entire initial output phrase which includes multiple output tokens 30. Each trained model 60 further includes a reward generation layer 110 to generate dense rewards 120 for each of the output tokens 30 based on the attention-based weights 80 computed by the attention layer 70 and the phrase sequence level score 100 generated by the scoring layer 90. In detail, for example, the dense reward 120 is the product of the attention-based weights 80 of each output token 30 and the phrase sequence level score 100 of the initial output phrase.

Considering a non-limiting example where the trained model 60 corresponding the fluency analysis determines the fluency of generated sentences. The reward generation layer 110 generates a probability distribution of likelihood over output tokens 30 at the predefined timestamp. The likelihood values of each output token 30 in the sentence, may be used as a measure of contribution of each output token 30 to the fluency of the sentence as a whole. In such an embodiment, dense reward 120 is a weighted sum of rewards of the style, content and fluency.

In addition, each trained model 60 further includes a feedback score generation layer 130 to generate a feedback score 140 based on the dense rewards 120 generated by the reward generation layer 110 and reward weights 150 assigned to the dense rewards of the corresponding trained models 60. In one embodiment, the feedback score generation layer 130 may generate the feedback score 140 by computing a weighted average of the dense rewards 120 of the corresponding trained models 60. Further, the feedback score generation layer 130 provides the feedback score 140 iteratively to the token generator subsystem 20 to generate a resultant output phrase based on comparison with the initial output phrase. In an exemplary embodiment, the feedback score generation layer 130 may provide the feedback score 140 to the token generator subsystem 20, wherein the token generator subsystem 20 generates a corrected output phrase in case when style of the initial output phrase is incorrectly transferred.

Figure 3:
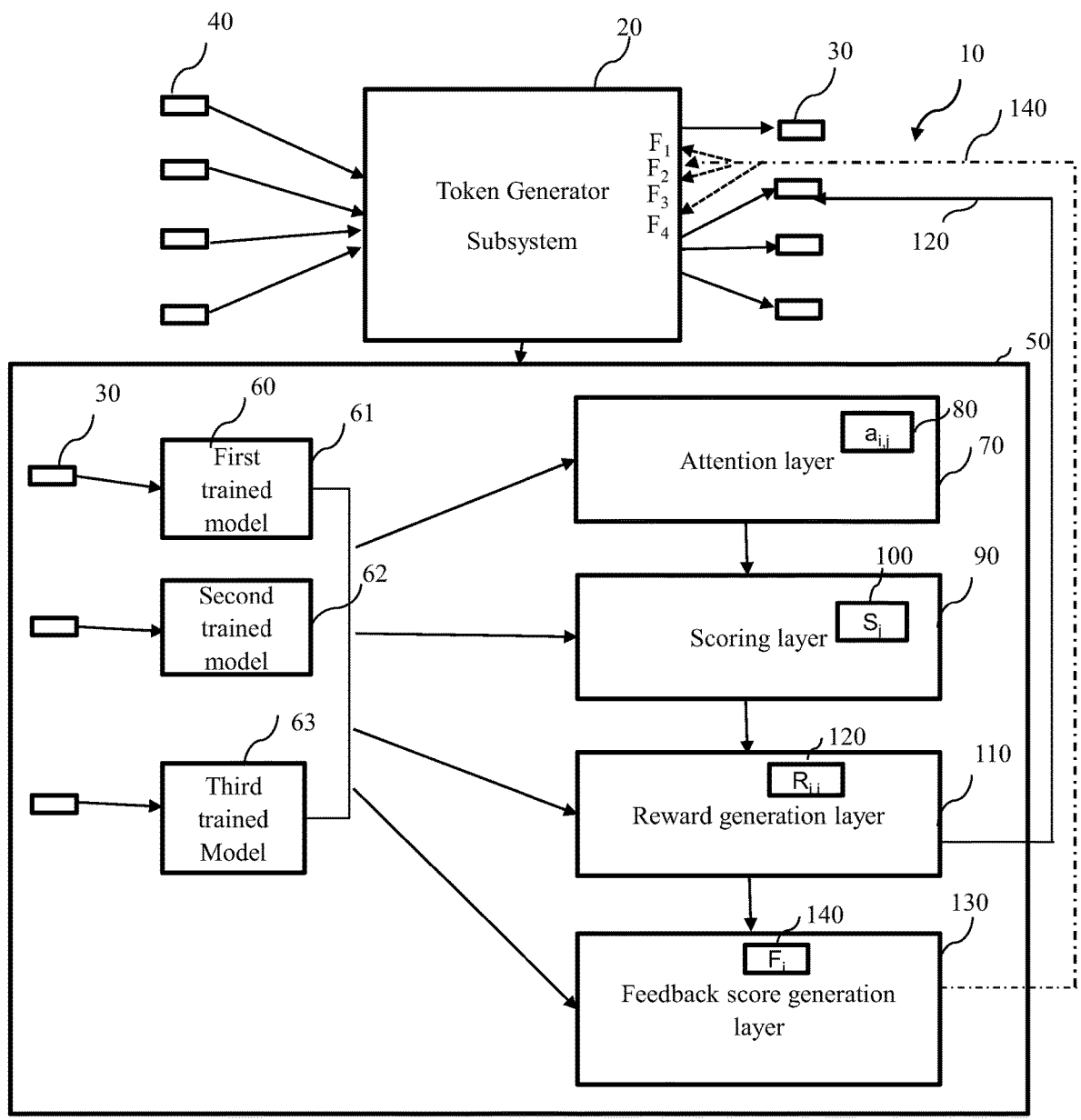
FIG. 3 is a schematic representation of an exemplary system for reinforcement learning based controlled natural language generation of FIG. 1 in accordance with an embodiment of the present disclosure.

FIG. 3 is a block diagram representation of an exemplary system 10 for reinforcement learning based controlled natural language generation of FIG. 1 in accordance with an embodiment of the present disclosure. Considering a non-limiting example where an input sentence (natural language text) is "The food was delightful". The input tokens 40 in such input sentence are "the", "food", "was" and "delightful". Consider that, in an exemplary embodiment, the task for the system is to transfer positive input sentences to negative output sentences and the content and meaning needs to be preserved, whereas the output sentence should be fluent. The token generator subsystem 20 of the system 10 receives the input tokens 40 and generates the initial output phrase 30 "the was food horrible" which is negative sentence generated based on the positive input sentence. The token generator subsystem 20 generates the output tokens 30 from the initial output phrase such as "the", "was", "food" and "horrible". The output validation subsystem 50 of the system 10 includes multiple trained models 60. Each of the trained model 60 is assigned with a predefined task. In the context of the aforementioned example, first trained model 61 is assigned the task of sentiment analysis. Similarly, the second trained model 62 is assigned the task of content analysis and the third trained model 63 is assigned the task of fluency analysis of the initial output phrase.

The multiple trained models 60 review the initial output phrase to identify that whether the correct sentence is generated or not. In order to do so, the each of the trained model 60 includes various layer which performs the task of reviewing the initial output phrase. The trained models 60 include a contextual embedding layer which receives the output tokens 30 and generates embeddings for each of the output tokens 30 such as "the is 0011", "was is 1010", "food is 1102" and "horrible is 2121". Further, the contextual embedding layer assigns encoding codes to the output tokens 30 based on the embeddings. Based on the applied attention, the attention layer 70 computes attention based weights (ai,j) 80 for each output token 30 such as "the is a1,j", "was is a2,j", "food is a3,j" and "horrible is a4,j", where a is the attention based weight provided by the trained models j to each token 1, 2, 3 and 4 (the was food horrible). For content analysis, the attention-based weights 80 are used to identify proportion of words in the initial output phrase and selects the "was" and "food" tokens from the initial output phrase.

Furthermore, the score generation layer 90 of the trained models 60 generates a phrase sequence level score (Sj) 100 for entire initial output phrase including all the output tokens 30. The reward generation layer 110 of the trained models (60) generate dense rewards (Ri,j) 120 for each of the output tokens 30 based on the attention-based weights 80 (ai,j) and the phrase sequence level score 100 (Sj). Hence, the trained models 60 corresponding to each task (sentiment analysis, content analysis and fluency analysis) generates dense rewards (Ri,j) 120 for each output token (the a1j, was a2j, food a3j, horrible a4j) based on the attention-based weights 80 (ai,j) and the phrase sequence level score 100 (Sj) as shown in the below mentioned non-limiting example equation (1):

$$R_{i,j} = a_{i,j} \times S_j \quad (1)$$

For fluency analysis, the dense rewards 120 are used as a measure of contribution of each output token 30 to the fluency of the sentence as a whole. Moreover, the feedback score generation layer 130 of the trained models 60 generates a feedback score (Fi) 140 for each of the output tokens 30 based on the dense rewards 120 (Ri,j) and reward weights 150 (Ij) assigned to the dense rewards (Ri,j) of the corresponding trained models 60. Continuing the same example, the feedback score (Fi) 140 is the weighted average of dense rewards 120 of all the feedback scores (F1, F2, F3 and F4) assigned to each output token 30 which is shown using a below mentioned equation (2):

$$F_i = \Sigma (I_j \times R_{i,j}) \quad (2)$$

The feedback score 140 is provided to the token generator subsystem 20 by each of the trained model 60 to identify the correctness of the initial output sentence. The token generator subsystem 20 determines correctness of the initial output sentence based on the received feedback score 140 from each of the trained model 60 such that the first trained model 61 for sentiment analysis identifies that the positive sentiment (delightful) is correctly converted into the negative sentiment (horrible). Similarly, the second trained model 62 (content analysis) identifies that content of the initial output is correct as the output sentence includes all the content words of the input sentence. The third trained model 63 (fluency analysis) identifies that there is some issue in the fluency because of order of the words food and was. Hence, based on the analysis, the token generator subsystem 20 generates a corrected output sentence "the food was horrible". The feedback score 140 is used to further train the various trained models 60 for future to generate better results for future inputs.

Figure 4:
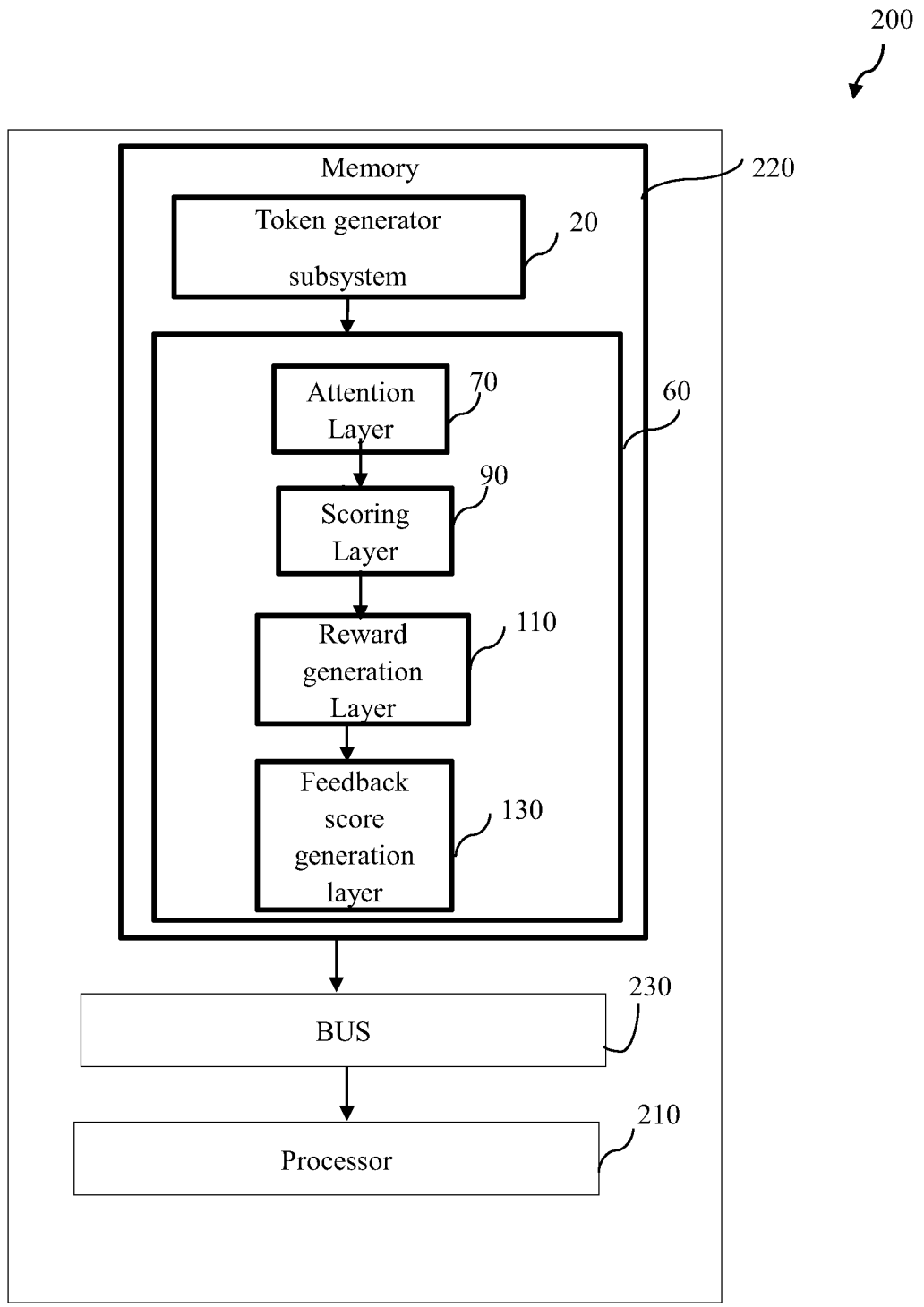
FIG. 4 is a block diagram of a computer or a server in accordance with an embodiment of the present disclosure.

FIG. 4 is a computer or a server 200 for the system for classification of the customer query in accordance with an embodiment of the present disclosure. The server includes processor(s) 210, and memory 220 operatively coupled to the bus 230. The processor(s) 210, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 220 includes a plurality of subsystems stored in the form of executable program which instructs the processor 210 to perform the method steps illustrated in FIG. 1. The memory 220 has following subsystems: a token generator subsystem 20, an output validation subsystem 50 including trained models 60. The trained models 60 includes an attention layer 70, a scoring layer 90, a reward generation layer 110 and a feedback score generation layer 130.

The memory 220 includes a token generator subsystem 20 to generate an initial output phrase including a sequence of output tokens 30 based on a sequence of input tokens 40 corresponding to a natural language text. The memory 220 also includes an output validation subsystem 50 includes trained models 60 associated with corresponding predefined tasks. Each trained model 60 include an attention layer 70 to compute attention-based weights 80 for each of the corresponding output tokens 30 generated by the token generator subsystem 20. The trained models 60 also include a scoring layer 90 to generate a phrase sequence level score 100 for the output phrase including the output tokens 30 generated by the token generator subsystem 20.

The trained models 60 further include a reward generation layer 110 to generate dense rewards 120 for each output token 30 based on the attention-based weights 80 computed by the attention layer 70 and the phrase sequence level score 100 generated by the scoring layer 90. The trained models 60 further include a feedback score generation layer 130 to generate a feedback score 140 based on the dense rewards 120 generated by the reward generation layer 110 and reward weights 150 assigned to the dense rewards 120 of the corresponding trained models 60. The feedback score generation layer 130 also provides the feedback score 140 iteratively to the token generator subsystem 20 to generate a resultant output phrase based on comparison with the initial output phrase.

Computer memory 220 elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable programs stored on any of the above-mentioned storage media may be executable by the processor(s) 210.

Figure 5:
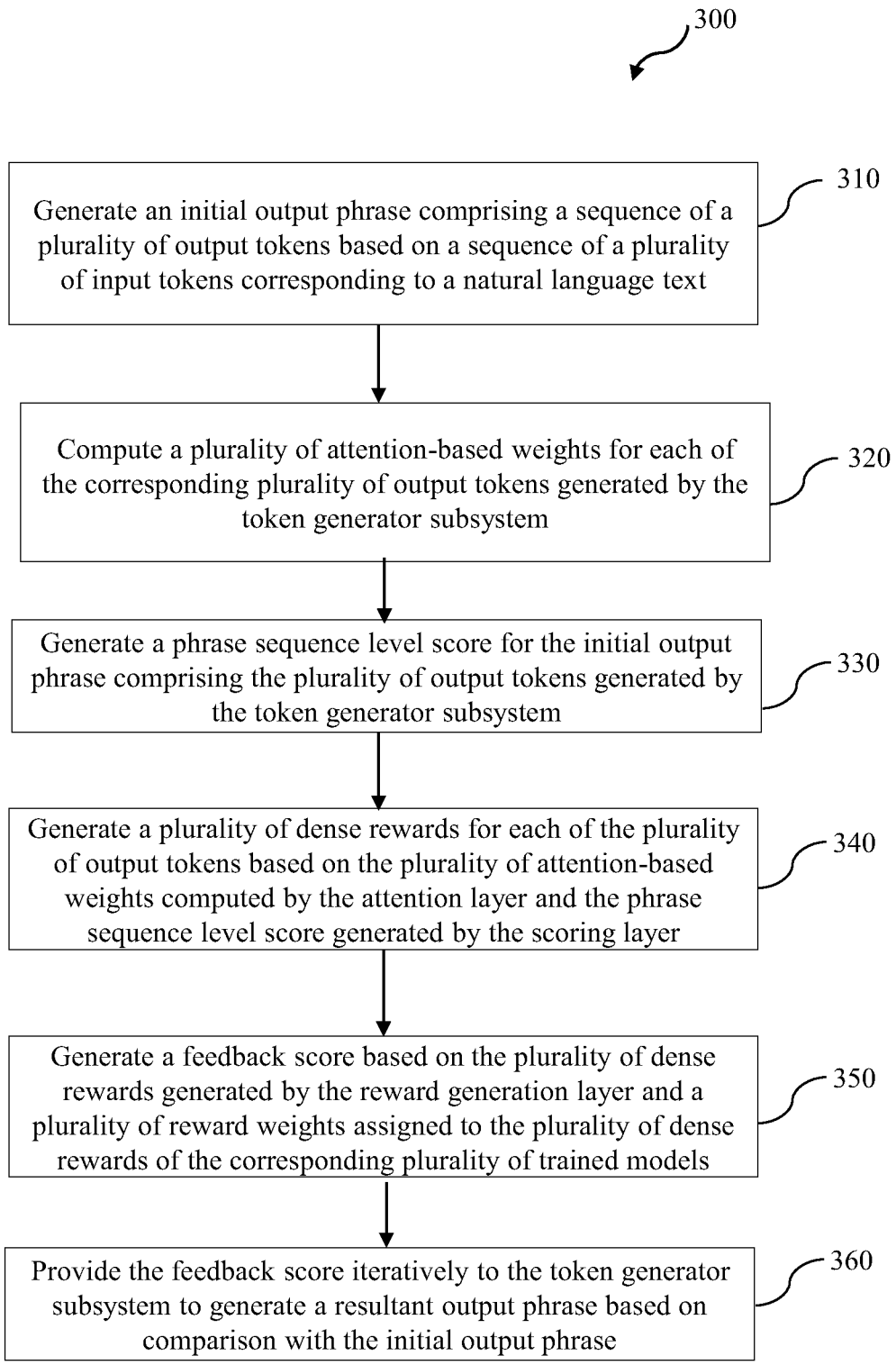
FIG. 5 is a flow chart representing the steps involved in a method for reinforcement learning based controlled natural language generation in accordance with an embodiment of the present disclosure.

FIG. 5 is a flow chart representing the steps involved in a method 300 for reinforcement learning based controlled natural language generation in accordance with an embodiment of the present disclosure. The method 300 includes generating an initial output phrase including a sequence of output tokens based on a sequence of input tokens corresponding to a natural language text in step 310. In one embodiment, generating the initial output phrase including the sequence of output tokens may include generating the initial output phrase including the sequence of output tokens by a token generator subsystem. In such an embodiment, generating the initial output phrase including the sequence of output tokens may include generating the output phrase including the sequence of output tokens by sampling from a vocabulary at each timestamp. In some embodiments, the output tokens may be representative of words. In one embodiment, the natural language text may include a text of first style. In another embodiment, the initial output phrase may include a text of second style which is different from the first style. In one embodiment, the initial output phrase may include one or more attributes-based output tokens and one or more content-based output tokens. The attribute words decide the style of the output and the content words determine the extent of content preservation.

The method 300 also includes computing attention-based weights for each of the corresponding output tokens in step 320. In one embodiment, computing the attention-based weights may include computing the attention-based weights by an attention layer of trained models. Each trained model is associated with corresponding predefined tasks. In one embodiment, the trained models associated with the corresponding predefined tasks may include a sentiment analysis, a content analysis, and a fluency analysis. In such an embodiment, computing the attention-based weights may include assigning encoding codes based on embeddings corresponding to the one or more attributes-based output tokens and the one or more content-based output tokens. In some embodiments, computing the attention-based weights may include computing the attention-based weights by applying higher attention on the encoding codes corresponding to the one or more attributes-based output tokens than the encoding codes corresponding to one or more content-based output token.

The method 300 further includes generating a phrase sequence level score for the initial output phrase including the output tokens in step 330. In one embodiment, generating the phrase sequence level score for the initial output phrase may include generating the phrase sequence level score for the initial output phrase by a scoring layer of the plurality of trained models. More specifically, the scoring layer generates the phrase sequence level score for the entire initial output phrase which includes multiple output tokens. Furthermore, the method 300 includes generating dense rewards for each of the output tokens based on the attention-based weights and the phrase sequence level score in step 340. In one embodiment, generating the dense rewards for each of the output tokens may include generating the dense rewards for each of the output tokens by a reward generation layer of the plurality of trained models. In detail, the dense reward is the product of the attention-based weights of each output token and the phrase sequence level score of the initial output phrase.

In addition, the method 300 includes generating a feedback score based on the dense rewards and reward weights assigned to the dense rewards of the corresponding trained models in step 350. In one embodiment, generating the feedback score may include generating the feedback score by a feedback score generation layer of the plurality of trained models. In such an embodiment, generating the feedback score may include generating the feedback score by computing a weighted average of the dense rewards of the corresponding trained models. The method 300 further includes providing the feedback score iteratively to the token generator subsystem to generate a resultant output phrase based on comparison with the initial output phrase in step 360. In one embodiment, providing the feedback score iteratively to the token generator subsystem may include providing the feedback score iteratively to the token generator subsystem by the feedback score generation layer of the trained models. In an exemplary embodiment, the feedback score generation layer may provide the feedback score to the token generator subsystem, wherein the token generator subsystem generates a corrected output phrase in case when style of the initial output phrase is incorrectly transferred.

Various embodiments of the system and method for reinforcement learning based controlled natural language generation as described above enables reinforcement learning by providing the trained model feedback on the trained model's performance on each of the goals of style transfer during training. The system maintains consistent context across longer sentences based on the dense reward computed for the output tokens. The system also maintains consistency of style even for sentences having multiple attribute words.

The system produces output phrase having appropriate and meaningful attributes and reduces redundancy and repetition of words in output phrase as compared to the output phrase. The text style transfer has been used to adapt texts to specific artistic writing styles, make texts formal or informal, alter sentiment, rewrite factual sentences into romantic or humorous ones, generate poetry, personalize dialogue systems and to identify obfuscate gender in social media posts or the like.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for reinforcement learning based controlled natural language generation comprising:
a token generator subsystem configured to generate an initial output phrase comprising a sequence of a plurality of output tokens based on a sequence of a plurality of input tokens corresponding to a natural language text; and an output validation subsystem comprises a plurality of trained models associated with a corresponding plurality of predefined tasks wherein each of the plurality of trained model comprises:
an attention layer configured to compute a plurality of attention-based weights for each of the corresponding plurality of output tokens generated by the token generator subsystem and wherein the attention layer is configured to assign a plurality of encoding codes based on a plurality of embeddings corresponding to one or more attributes-based output tokens and one or more content-based output tokens of the plurality of output tokens;
a scoring layer configured to generate a phrase sequence level score for the initial output phrase comprising the plurality of output tokens generated by the token generator subsystem;
a reward generation layer configured to generate a plurality of dense rewards for each of the plurality of output tokens based on the plurality of attention-based weights computed by the attention layer and the phrase sequence level score generated by the scoring layer; and
a feedback score generation layer configured to:
generate a feedback score based on the plurality of dense rewards generated by the reward generation layer and a plurality of reward weights assigned to the plurality of dense rewards of the corresponding plurality of trained models; and
provide the feedback score iteratively to the token generator subsystem to generate a resultant output phrase based on comparison with the initial output phrase.

2. The system as claimed in claim 1, wherein the plurality of output tokens comprises a plurality of words.

3. The system as claimed in claim 1, wherein the natural language text comprises a text of a first style.

4. The system as claimed in claim 3, wherein the initial output phrase comprises a text of a second style different from the first style.

5. The system as claimed in claim 1, wherein the token generator subsystem is configured to generate the output phrase by sampling from a vocabulary at each timestamp.

6. The system as claimed in claim 1, wherein the plurality of trained models associated with the corresponding plurality of predefined tasks comprises a sentiment analysis, a content analysis, and a fluency analysis.

7. The system as claimed in claim 1, wherein the attention layer is configured to compute the plurality of attention-based weights by applying higher attention on the plurality of encoding codes corresponding to the one or more attributes based output tokens than the plurality of encoding codes corresponding to the one or more content based output tokens.

8. The system as claimed as claim 1, wherein the feedback score generation layer is configured to generate a feedback score by computing a weighted average of the plurality of dense rewards of the corresponding plurality of trained models.

9. The system of claim 1, wherein the reinforcement learning based natural language generation comprises text style transfer, machine translation and summarization.

10. A method comprising:
generating, by a token generator subsystem, an initial output phrase comprising a sequence of a plurality of output tokens based on a sequence of a plurality of input tokens corresponding to a natural language text;
computing, by an attention layer of a plurality of trained models, a plurality of attention-based weights for each of the corresponding plurality of output tokens wherein computing the plurality of attention-based weights comprises assigning a plurality of encoding codes based on a plurality of embeddings corresponding to one or more attributes-based output tokens and one or more content-based output tokens of the plurality of output tokens;
generating, by a scoring layer of the plurality of trained models, a phrase sequence level score for the initial output phrase comprising the plurality of output tokens;
generating, by a reward generation layer of the plurality of trained models, a plurality of dense rewards for each of the plurality of output tokens based on the plurality of attention-based weights and the phrase sequence level score;
generating, by a feedback score generation layer of the plurality of trained models, a feedback score based on the plurality of dense rewards and a plurality of reward weights assigned to the plurality of dense rewards of the corresponding plurality of trained models; and
providing, by the feedback score generation layer of the plurality of trained models, the feedback score iteratively to the token generator subsystem to generate a resultant output phrase based on comparison with the initial output phrase.

11. The method as claimed in claim 10, wherein computing the plurality of attention-based weights comprises applying higher attention on the plurality of encoding codes corresponding to the one or more attributes-based output tokens than the plurality of encoding codes corresponding to the one or more content-based output token.

12. The method as claimed in claim 10, wherein generating the initial output phrase comprises generating the output phrase by sampling from a vocabulary at each timestamp.

13. The method as claimed in claim 10, wherein generating the feedback score comprises computing a weighted average of the plurality of dense rewards of the corresponding plurality of trained models.

* * * * *